(12) United States Patent
Ye et al.

(10) Patent No.: US 12,023,840 B2
(45) Date of Patent: Jul. 2, 2024

(54) IN-MOLD INJECTION MOLDING PROCESS FOR PCBA SOFT MATERIAL

(71) Applicant: Dong Guan Zhong Kang Technology Electronics Co., Ltd., Dongguan (CN)

(72) Inventors: Jianxin Ye, Dongguan (CN); Yuping Luo, Dongguan (CN); Shihao Huang, Dongguan (CN); Weizhong Zhang, Dongguan (CN)

(73) Assignee: DONG GUAN ZHONG KANG TECHNOLOGY ELECTRONICS CO LTD, Dongguan (CN)

( * ) Notice: Subject to any disclaimer, the term of this patent is extended or adjusted under 35 U.S.C. 154(b) by 427 days.

(21) Appl. No.: 17/456,590

(22) Filed: Nov. 25, 2021

(65) Prior Publication Data

US 2022/0080643 A1   Mar. 17, 2022

(30) Foreign Application Priority Data

Dec. 1, 2020   (CN) .......................... 202011380119.8

(51) Int. Cl.
| | |
|---|---|
| *B29C 48/18* | (2019.01) |
| *B21C 23/22* | (2006.01) |
| *B21C 25/02* | (2006.01) |
| *B22F 5/10* | (2006.01) |
| *B22F 7/06* | (2006.01) |
| *B23P 15/28* | (2006.01) |
| *B22F 5/00* | (2006.01) |

(52) U.S. Cl.
CPC .............. *B29C 48/18* (2019.02); *B21C 23/22* (2013.01); *B21C 25/02* (2013.01); *B22F 5/10* (2013.01); *B22F 7/06* (2013.01); *B23P 15/28* (2013.01); *B22F 2005/001* (2013.01); *B22F 2005/004* (2013.01); *B22F 2998/10* (2013.01); *Y10T 29/49002* (2015.01)

(58) Field of Classification Search
CPC ............ B29C 48/18; H05K 2203/1327; H05K 3/207; H05K 2201/0129; Y10T 29/49002
USPC ............................... 29/592.1, 825, 829, 846
See application file for complete search history.

(56) References Cited

U.S. PATENT DOCUMENTS

| | | | |
|---|---|---|---|
| 2006/0071366 A1 | 4/2006 | Iriyama | |
| 2007/0108650 A1 | 5/2007 | Mirchandani et al. | |
| 2009/0230487 A1* | 9/2009 | Saitoh | B81C 1/00333 |
| | | | 257/659 |
| 2009/0250249 A1* | 10/2009 | Racz | H01L 23/13 |
| | | | 29/829 |
| 2013/0043615 A1 | 2/2013 | Mirchandani et al. | |

* cited by examiner

*Primary Examiner* — Thiem D Phan
(74) *Attorney, Agent, or Firm* — Zhigang Ma

(57) ABSTRACT

The present disclosure provides an in-mold injection molding process for a Printed Circuit Board Assembly (PCBA) soft material, including the following steps: 1) preheating a Polyethylene Terephthalate (PET) thin film; 2) printing patterns; 3) preparing a diaphragm A; 4) laminating a diaphragm on a Flexible Printed Circuit (FPC) board; 5) scraping printing ink; 6) scraping an adhesive; 7) preparing an inner diaphragm B; and 8) placing prepared diaphragm A and FPC board laminated diaphragm in a mold cavity of an injection mold of a Haitian 130T injection molding machine, preheating injection mold to 30° C., and injecting Thermoplastic Polyurethane (TPU) resin through an injection hole, so that diaphragm A is on an outer side of a product mobile phone protective shell, FPC board laminated diaphragm is on an inner side of the product mobile phone protective shell, and temperature of the TPU resin is at 180° C.

10 Claims, No Drawings

IN-MOLD INJECTION MOLDING PROCESS FOR PCBA SOFT MATERIAL

TECHNICAL FIELD

The present disclosure relates to an in-mold injection molding technology for a Printed Circuit Board Assembly (PCBA) soft material, in particular, to an in-mold injection molding process for the PCBA soft material.

BACKGROUND

An existing soft PCBA manufacturing method is to bond an FPC to an injection-molded mobile phone protective shell by using 3M adhesive, and then is to bond and cover by using materials, such as flannelette. The appearance of the existing product is too thick, which is inconvenient to consume and use. The existing product is not firmly bonded by using a 3M adhesive, which has the problems of short service life and easiness in aging. A product FPC board has poor waterproof, moisture-proof and leakage proof performance.

SUMMARY

In view of this, a main objective of the present disclosure is to provide an in-mold injection molding process for a PCBA soft material. The adopted technical solutions are as follows:

An in-mold injection molding process for a PCBA soft material, including the following steps:
1) preheating a Polyethylene Terephthalate (PET) thin film: baking the PET thin film in a baking oven for 3 to 5 min at 60 to 120° C.;
2) printing patterns: placing the preheated PET thin film on a printer to print patterns, where the PET thin film needs to be baked and dried after being printed, the baking temperature is 80 to 110° C., and the time is 0.5 to 1.5 h;
3) preparing a diaphragm A: cutting a required shape to obtain the diaphragm A by using a mold;
4) laminating a diaphragm on a Flexible Printed Circuit (FPC) board: scraping an Ultraviolet (UV) adhesive on a printing surface of the PET thin film printed in step 2) and laminating the printed PET thin film with the FPC board, then performing UV light curing drying, and combining to manufacture an FPC board laminated diaphragm;
5) scraping printing ink: scraping a layer of printing oil on an FPC board side in the prepared FPC board laminated diaphragm prepared in step 4);
6) scraping an adhesive: scraping a layer of adhesive on a printing ink side in step 5), and placing the prepared FPC board laminated diaphragm in the baking oven for curing, where the temperature is 80 to 120° C., and the time is 0.5 to 1.5 h;
7) preparing an inner diaphragm B: after step 6) is completed, cutting the FPC board laminated diaphragm scraped with the adhesive into a required shape by using a mold, so as to prepare the inner diaphragm B; and
8) placing the prepared diaphragm A and the FPC board laminated diaphragm in a mold cavity of an injection mold, preheating the injection mold to 30 to 70° C., and injecting Thermoplastic Polyurethane (TPU) resin through an injection hole, so that the diaphragm A is on an outer side of a product mobile phone protective shell, and the FPC board laminated diaphragm is on an inner side of the product mobile phone protective shell.

In step 2), the PET thin film is placed on a printing machine for printing the patterns by using Teikoku IMD special printing ink.

In step 5), IMB-IPX series color printing ink is scraped on the FPC board.

In step 6), an IMD-003 adhesive is scraped on a printing ink layer.

In step 8), TPU resin injection molding is performed by using a Haitian 130T injection molding machine.

In step 8), the temperature of the TPU resin is 180 to 220° C.

In step 1), the PET thin film is baked in a baking oven for 3 to 5 min at 80 to 105° C.

In step 2), the preheated PET thin film is placed on a printer for printing patterns, the PET thin film needs to be baked and dried after being printed, the baking temperature is 85 to 100° C., and the time is 0.8 to 1.2 h.

In step 6), a layer of adhesive is scraped on a printing ink side, the prepared FPC board laminated diaphragm is placed in the baking oven for curing, the temperature is 85 to 100° C., and the time is 0.8 to 1.2 h.

In step 8), the prepared diaphragm A and the FPC board laminated diaphragm are placed in a mold cavity of an injection mold, the injection mold is preheated to 40 to 50° C., and TPU resin is injected through an injection hole, so that the diaphragm A is on an outer side of a product mobile phone protective shell, and the FPC board laminated diaphragm is on an inner side of the product mobile phone protective shell.

According to the present disclosure, the PET thin film and the FPC board are laminated to form the FPC board laminated diaphragm by means of a thin film printing technology, then the diaphragm A and the inner diaphragm B are formed on the basis of the FPC board laminated diaphragm, and the diaphragm A and the inner diaphragm B are combined by using an in-mold injection molding process technology.

DETAILED DESCRIPTION OF THE EMBODIMENTS

The present disclosure will be described below in combination with embodiments.

Embodiment 1

An in-mold injection molding process for a PCBA soft material includes the following steps:
1) in a PET preheating step, the PET thin film is baked in a baking oven for 3 min at the temperature of 60° C.;
2) in a pattern printing step, the preheated PET thin film is placed on a printer to print patterns by using Teikoku 1 MB special printing ink, the PET thin film needs to be baked and dried after being printed, the baking temperature is 80° C., and the time is 0.5 h;
3) in a diaphragm A preparing step, a required shape is cut to obtain the diaphragm A by using a mold;
4) in a step of laminating a diaphragm on an FPC board, a UV adhesive is scraped on a printing surface of the PET thin film printed in step 2), the printed PET thin film is laminated with the FPC board, and then UV light curing drying is performed to combine and manufacture an FPC board laminated diaphragm;
5) in a printing ink scraping step: a layer of printing oil is scraped, by using IMD-IPX series color printing ink, on an FPC board side in the prepared FPC board laminated diaphragm prepared in step 4);

6) in an adhesive scraping step: a layer of adhesive is scraped, by using an IMD-003 adhesive, on a printing ink side in step 5), and the prepared FPC board laminated diaphragm is placed in the baking oven for curing, where the temperature is to 80° C., and the time is 0.5 h;

7) in an inner diaphragm B preparing step: after step 6) is completed, the FPC board laminated diaphragm scraped with the adhesive is cut into a required shape by using a mold, so as to prepare the inner diaphragm B; and 8) the prepared diaphragm A and the FPC board laminated diaphragm are placed in a mold cavity of an injection mold of a Haitain 130T injection molding machine, the injection mold is preheated to 30° C., and TPU resin is injected through an injection hole, so that the diaphragm A is on an outer side of a product mobile phone protective shell, the FPC board laminated diaphragm is on an inner side of the product mobile phone protective shell, and the temperature of the TPU resin is 180° C.

Embodiment 2

An in-mold injection molding process for a PCBA soft material includes the following steps:
1) in a PET preheating step, the PET thin film is baked in a baking oven for 5 min at the temperature of 120° C.;
2) in a pattern printing step, the preheated PET thin film is placed on a printer to print patterns by using Teikoku 1 MB special printing ink, the PET thin film needs to be baked and dried after being printed, the baking temperature is 110° C., and the time is 1.5 h;
3) in a diaphragm A preparing step, a required shape is cut to obtain the diaphragm A by using a mold;
4) in a step of laminating a diaphragm on an FPC board, a UV adhesive is scraped on a printing surface of the printed PET thin film printed in step 2), the printed PET thin film is laminated with the FPC board, and then UV light curing drying is performed to combine and manufacture an FPC board laminated diaphragm;
5) in a printing ink scraping step: a layer of printing oil is scraped, by using IMD-IPX series color printing ink, on an FPC board side in the prepared FPC board laminated diaphragm prepared in step 4);
6) in an adhesive scraping step: a layer of adhesive is scraped, by using an IMD-003 adhesive, on a printing ink side in step 5), and the prepared FPC board laminated diaphragm is placed in the baking oven for curing, where the temperature is to 120° C., and the time is 1.5 h;
7) in an inner diaphragm B preparing step: after step 6) is completed, the FPC board laminated diaphragm scraped with the adhesive is cut into a required shape by using a mold, so as to prepare the inner diaphragm B; and
8) the prepared diaphragm A and the FPC board laminated diaphragm are placed in a mold cavity of an injection mold of a Haitain 130T injection molding machine, the injection mold is preheated to 70° C., and TPU resin is injected through an injection hole, so that the diaphragm A is on an outer side of a product mobile phone protective shell, the FPC board laminated diaphragm is on an inner side of the product mobile phone protective shell, and the temperature of the TPU resin is 220° C.

Embodiment 3

An in-mold injection molding process for a PCBA soft material includes the following steps:
1) in a PET preheating step, the PET thin film is baked in a baking oven for 4 min at the temperature of 80° C.;
2) in a pattern printing step, the preheated PET thin film is placed on a printer to print patterns by using Teikoku 1 MB special printing ink, the PET thin film needs to be baked and dried after being printed, the baking temperature is 85° C., and the time is 0.8 h;
3) in a diaphragm A preparing step, a required shape is cut to obtain the diaphragm A by using a mold;
4) in a step of laminating a diaphragm on an FPC board, a UV adhesive is scraped on a printing surface of the PET thin film printed in step 2), the printed PET thin film is laminated with the FPC board, and then UV light curing drying is performed to combine and manufacture an FPC board laminated diaphragm;
5) in a printing ink scraping step: a layer of printing oil is scraped, by using IMD-IPX series color printing ink, on an FPC board side in the prepared FPC board laminated diaphragm prepared in step 4);
6) in an adhesive scraping step: a layer of adhesive is scraped, by using an IMD-003 adhesive, on a printing ink side in step 5), and the prepared FPC board laminated diaphragm is placed in the baking oven for curing, where the temperature is to 85° C., and the time is 0.8 h;
7) in an inner diaphragm B preparing step: after step 6) is completed, the FPC board laminated diaphragm scraped with the adhesive is cut into a required shape by using a mold, so as to prepare the inner diaphragm B; and
8) the prepared diaphragm A and the FPC board laminated diaphragm are placed in a mold cavity of an injection mold of a Haitain 130T injection molding machine, the injection mold is preheated to 40° C., and TPU resin is injected through an injection hole, so that the diaphragm A is on an outer side of a product mobile phone protective shell, the FPC board laminated diaphragm is on an inner side of the product mobile phone protective shell, and the temperature of the TPU resin is 190° C.

Embodiment 4

An in-mold injection molding process for a PCBA soft material includes the following steps:
1) in a PET preheating step, the PET thin film is baked in a baking oven for 4 min at the temperature of 90° C.;
2) in a pattern printing step, the preheated PET thin film is placed on a printer to print patterns by using Teikoku 1 MB special printing ink, the PET thin film needs to be baked and dried after being printed, the baking temperature is 90° C., and the time is 1 h;
3) in a diaphragm A preparing step, a required shape is cut to obtain the diaphragm A by using a mold;
4) in a step of laminating a diaphragm on an FPC board, a UV adhesive is scraped on a printing surface of the PET thin film printed in step 2), the printed PET thin film is laminated with the FPC board, and then UV light curing drying is performed to combine and manufacture an FPC board laminated diaphragm;

5) in a printing ink scraping step: a layer of printing oil is scraped, by using IMD-IPX series color printing ink, on an FPC board side in the prepared FPC board laminated diaphragm prepared in step 4);
6) in an adhesive scraping step: a layer of adhesive is scraped, by using an IMD-003 adhesive, on a printing ink side in step 5), and the prepared FPC board laminated diaphragm is placed in the baking oven for curing, where the temperature is to 90° C., and the time is 1 h;
7) in an inner diaphragm B preparing step: after step 6) is completed, the FPC board laminated diaphragm scraped with the adhesive is cut into a required shape by using a mold, so as to prepare the inner diaphragm B; and
8) the prepared diaphragm A and the FPC board laminated diaphragm are placed in a mold cavity of an injection mold of a Haitain 13 OT injection molding machine, the injection mold is preheated to 50° C., and TPU resin is injected through an injection hole, so that the diaphragm A is on an outer side of a product mobile phone protective shell, the FPC board laminated diaphragm is on an inner side of the product mobile phone protective shell, and the temperature of the TPU resin is 200° C.

Embodiment 5

An in-mold injection molding process for a PCBA soft material includes the following steps:
1) in a PET preheating step, the PET thin film is baked in a baking oven for 4 min at the temperature of 105° C.;
2) in a pattern printing step, the preheated PET thin film is placed on a printer to print patterns by using Teikoku 1 MB special printing ink, the PET thin film needs to be baked and dried after being printed, the baking temperature is 100° C., and the time is 1.2 h;
3) in a diaphragm A preparing step, a required shape is cut to obtain the diaphragm A by using a mold;
4) in a step of laminating a diaphragm on an FPC board, a UV adhesive is scraped on a printing surface of the PET thin film printed in step 2), the printed PET thin film is laminated with the FPC board, and then UV light curing drying is performed to combine and manufacture an FPC board laminated diaphragm;
5) in a printing ink scraping step: a layer of printing oil is scraped, by using IMD-IPX series color printing ink, on an FPC board side in the prepared FPC board laminated diaphragm prepared in step 4);
6) in an adhesive scraping step: a layer of adhesive is scraped, by using an IMD-003 adhesive, on a printing ink side in step 5), and the prepared FPC board laminated diaphragm is placed in the baking oven for curing, where the temperature is to 100° C., and the time is 1.2 h;
7) in an inner diaphragm B preparing step: after step 6) is completed, the FPC board laminated diaphragm scraped with the adhesive is cut into a required shape by using a mold, so as to prepare the inner diaphragm B; and
8) the prepared diaphragm A and the FPC board laminated diaphragm are placed in a mold cavity of an injection mold of a Haitain 130T injection molding machine, the injection mold is preheated to 60° C., and TPU resin is injected through an injection hole, so that the diaphragm A is on an outer side of a product mobile phone protective shell, the FPC board laminated diaphragm is on an inner side of the product mobile phone protective shell, and the temperature of the TPU resin is 210° C.

In Embodiments 1 to 5, the PET thin film and the FPC board are laminated to form the FPC board laminated diaphragm by means of a thin film printing technology, then the diaphragm A and the inner diaphragm B are formed on the basis of the FPC board laminated diaphragm, and the diaphragm A and the inner diaphragm B are combined by using an in-mold injection molding process technology. The product prepared by the present disclosure adapts to the market demand, enhances the appearance attractiveness of the product, carries out technical innovation in accordance with the market demand, enhances the safety of the product, and improves the environmental protection function of the product.

The technical solutions provided by the embodiments of the present disclosure are introduced above in details. The principle and implementation manner of the embodiments of the present disclosure are described by using specific examples herein. The description of the embodiments above is only used for helping to understand the principle of the embodiments of the present disclosure. Meanwhile, for those of ordinary skill in the art, there will be changes in specific implementation manners and application scopes according to the embodiments of the present disclosure. In conclusion, the content of the specification should not be construed as a limitation to the present disclosure.

What is claimed is:
1. An in-mold injection molding process for a Printed Circuit Board Assembly (PCBA) soft material, comprising the following steps:
Step (1) preheating a Polyethylene Terephthalate (PET) thin film: baking the PET thin film in a baking oven for 3 to 5 min at 60 to 120° C.;
Step (2) printing patterns: placing the preheated PET thin film on a printer for printing patterns, wherein the PET thin film needs to be baked and dried after being printed, the baking temperature is 80 to 110° C., and the time is 0.5 to 1.5 h;
Step (3) preparing a diaphragm A: cutting a required shape to obtain the diaphragm A by using a mold;
Step (4) laminating a diaphragm on a Flexible Printed Circuit (FPC) board: scraping an Ultraviolet (UV) adhesive on a printing surface of the PET thin film printed in step (2) and laminating the printed PET thin film with the FPC board, then performing UV light curing drying, and combining to manufacture an FPC board laminated diaphragm;
Step (5) scraping printing ink: scraping a layer of printing oil on an FPC board side in the prepared FPC board laminated diaphragm prepared in step (4);
Step (6) scraping an adhesive: scraping a layer of adhesive on a printing ink side in step (5), and placing the prepared FPC board laminated diaphragm in the baking oven for curing, wherein the temperature is 80 to 120° C., and the time is 0.5 to 1.5 h;
Step (7) preparing an inner diaphragm B: after step (6) is completed, cutting the FPC board laminated diaphragm scraped with the adhesive into a required shape by using a mold, so as to prepare the inner diaphragm B; and
Step (8) placing the prepared diaphragm A and the FPC board laminated diaphragm in a mold cavity of an injection mold, preheating the injection mold to 30 to 70° C., and injecting Thermoplastic Polyurethane (TPU) resin through an injection hole, so that the diaphragm A is on an outer side of a product mobile phone protective shell, and the FPC board laminated diaphragm is on an inner side of the product mobile phone protective shell.

2. The in-mold injection molding process for a PCBA soft material according to claim 1, wherein, in step (2), the PET thin film is placed on a printing machine for printing the patterns by using Teikoku IMD special printing ink.

3. The in-mold injection molding process for a PCBA soft material according to claim 1, wherein, in step (5), IMD-IPX series color printing ink is scraped on the FPC board.

4. The in-mold injection molding process for a PCBA soft material according to claim 1, wherein, in step (6), an IMD-003 adhesive is scraped on a printing ink layer.

5. The in-mold injection molding process for a PCBA soft material according to claim 1, wherein, in step (8), TPU resin injection molding is performed by using a Haitian 130T injection molding machine.

6. The in-mold injection molding process for a PCBA soft material according to claim 1, wherein, in step (8), the temperature of the TPU resin is 180 to 220° C.

7. The in-mold injection molding process for a PCBA soft material according to claim 1, wherein, in step (1), the PET thin film is baked in the baking oven for 3 to 5 min at the temperature of 80 to 105° C.

8. The in-mold injection molding process for a PCBA soft material according to claim 1, wherein, in step (2), the preheated PET thin film is placed on the printing machine for printing the patterns, and the printed PET thin film needs to be baked and dried; the baking temperature is 85 to 100° C.; and the time is 0.8 to 1.2 h.

9. The in-mold injection molding process for a PCBA soft material according to claim 1, wherein, in step (6), a layer of adhesive is scraped on the printing ink layer, and the FPC board laminated diaphragm is placed in the baking oven for curing, the temperature is 85 to 100° C., and the time is 0.8 to 1.2 h.

10. The in-mold injection molding process for a PCBA soft material according to claim 1, wherein, the step (8), the prepared diaphragm A and the FPC board laminated diaphragm are placed in the mold cavity of the injection mold, the injection mold is preheated to 40 to 50° C., and the Thermoplastic Polyurethane (TPU) resin is injected through the injection hole, so that the diaphragm A is on the outer side of a product mobile phone protective shell, and the FPC board laminated diaphragm is on the inner side of the product mobile phone protective shell.

\* \* \* \* \*